(12) United States Patent
Kim et al.

(10) Patent No.: US 8,774,586 B2
(45) Date of Patent: Jul. 8, 2014

(54) FIBER OPTICS CONNECTION BOX

(71) Applicant: LS Cable & System Ltd., Anyang-si (KR)

(72) Inventors: Sang Yub Kim, Suwon-si (KR); Hyup Jae Chung, Seoul (KR); Myung Ryun Yoon, Nonsan-si (KR); Tae Seon Moon, Nonsan-si (KR); Eun Jung Choi, Anyang-si (KR)

(73) Assignee: LS Cable & System Ltd., Anyang-si, Gyeonggi-do (KR)

( * ) Notice: Subject to any disclaimer, the term of this patent is extended or adjusted under 35 U.S.C. 154(b) by 8 days.

(21) Appl. No.: 13/665,137

(22) Filed: Oct. 31, 2012

(65) Prior Publication Data
US 2013/0236151 A1 Sep. 12, 2013

(30) Foreign Application Priority Data

Mar. 12, 2012 (KR) .................. 10-2012-0024986
Aug. 27, 2012 (KR) .................. 10-2012-0093676

(51) Int. Cl.
*G02B 6/00* (2006.01)

(52) U.S. Cl.
USPC .................................. 385/135; 385/138

(58) Field of Classification Search
USPC .................................. 385/135, 138
See application file for complete search history.

(56) References Cited

U.S. PATENT DOCUMENTS

| | | | | |
|---|---|---|---|---|
| 5,509,099 | A * | 4/1996 | Hermsen et al. | 385/134 |
| 7,499,622 | B2 * | 3/2009 | Castonguay et al. | 385/135 |
| 2009/0304341 | A1 * | 12/2009 | Shimirak et al. | 385/135 |
| 2011/0217017 | A1 * | 9/2011 | Drouard et al. | 385/135 |

* cited by examiner

*Primary Examiner* — Omar Rojas
(74) *Attorney, Agent, or Firm* — Sherr & Jiang, PLLC

(57) ABSTRACT

Disclosed herein is a fiber optics connection box in which a feeding cable introduced into the fiber optics connection box is processed by an optical processing module and is withdrawn as out cables, passing cables pass through a receiving space defined in the fiber optics connection box, thereby improving watertightness, work efficiency, and price competitiveness in a state in which the cables are mounted or while the cables are mounted.

24 Claims, 12 Drawing Sheets

FIBER OPTICS CONNECTION BOX

CROSS REFERENCE TO PRIOR APPLICATIONS

The present application claims priority under 35 U.S.C. §119 to Korean Patent Application Nos. 10-2012-0024986 (filed on Mar. 12, 2012) and 10-2012-0093676 (filed on Aug. 27, 2012), which are all hereby incorporated by reference in their entirety.

BACKGROUND OF THE INVENTION

1. Field of the Invention

The present invention relates to a fiber optics connection box. More particularly, the present invention relates to a fiber optics connection box with improved watertightness, work efficiency, and price competitiveness.

2. Description of the Related Art

Generally, a fiber optics connection box is installed at a subscriber line, a central office, a relay station, etc. to distribute or connect optical cables so that the optical cables can be connected to a plurality of systems or consumer sides or to treat the remaining portions of the optical cables. Optical cables, supplied from an optical communication supplier, are introduced into consumer sides so that the optical cables can be distributed or connected to the consumer sides. In a case in which such distribution or connection of the optical cables at a specific place is not needed, it may be necessary to treat the remaining portions of the optical cables.

Generally, watertightness may be a very important performance index depending upon a place at which a fiber optics connection box is installed. This is because, in a case in which the fiber optics connection box is installed outdoors or underground, watertightness of the fiber optics connection box must be secured in order to prevent rainwater or sewage from infiltrating into the fiber optics connection box.

In the conventional art, a heat shrink tube is generally used to secure such watertightness, or an exclusive part for securing such watertightness may further be included in the fiber optics connection box. In the former case, however, it is necessary for an engineer to handle a heat gun during work of the fiber optics connection box with the result that the engineer may be injured, and, in addition, such work is inconvenient and troublesome. In the latter case, on the other hand, the exclusive part for securing such watertightness must be additionally mounted in the fiber optics connection box. In this case, the exclusive part for securing such watertightness greatly increases production cost of the fiber optics connection box.

Also, distribution or connection of optical cables or treatment of the remaining portions of the optical cables must be carried out in the fiber optics connection box whenever optical communication subscribers are changed or added. In the fiber optics connection box, therefore, it is necessary for work convenience, efficiency, and price competitiveness to be secured during work of optical cables.

SUMMARY OF THE INVENTION

Therefore, the present invention has been made in view of the above problems, and it is an object of the present invention to provide a fiber optics connection box, assembly time and assembly process of which are shortened during assembly of the fiber optics connection box.

It is another object of the present invention to provide a fiber optics connection box which can be more conveniently assembled by an engineer when the fiber optics connection box is disassembled and reassembled.

It is yet another object of the present invention to provide a fiber optics connection box in which moisture is prevented from infiltrating into the fiber optics connection box, thereby improving watertightness of the fiber optics connection box, and the number of components constituting the fiber optics connection box is minimized, thereby securing price competitiveness. In accordance with an aspect of the present invention, the above and other objects can be accomplished by the provision of a fiber optics connection box comprising a cover having a receiving space defined therein, a base having an inlet port through which a feeding cable is introduced, the inlet port having a fastening boss, an outlet port through which out cables are withdrawn, the outlet port having a fastening boss, and a pair of through holes through which a passing cable passes via the receiving space of the cover, the base being provided to cover the receiving space, at least one optical processing module provided in the receiving space to split or splice the feeding cable into the out cables, a support frame mounted at the base to support the optical processing module, sealing members to seal the inlet port and the outlet port and fastening members fastened into the fastening boss of the inlet port and the fastening boss of the outlet port in a state in which the sealing members are disposed at the inlet port and the outlet port, wherein the fastening bosses are integrally formed at the base, and the fastening bosses protrude outward from the base.

The sealing members may have through holes, through which the feeding cable and the out cables pass, and the sealing members are partially inserted in the respective fastening bosses.

Each of the sealing members may have a inclined portion in which an outer diameter of each of the sealing members is changed.

The inclined portion may be formed at a whole portion of each of the sealing members.

The inclined portion may comprise a step part at which an outer circumferential inclination of each of the sealing members is increased and then decreased or decreased and then increased.

The step part may have an angle of greater than 0 to 60 degrees.

The inlet port and the outlet port may be disposed around the pair of through holes, the base comprises a first base part and a second base part, which are detachably coupled to each other, and the pair of through holes is provided at the first base part or the second base part constituting the base.

The pair of through holes may be provided at a central part of the base.

The first base part and the second base part may have different sizes.

The boundary line, by which the first base part and the second base part may be partitioned from each other, is spaced apart from a center line passing through centers of the pair of the through holes by a predetermined distance.

The distance between the boundary line and the center line may be equal to or greater than a radius of each of the through holes.

The base comprises a first base part and a second base part, which may be detachably coupled to each other, and the pair of through holes is respectively provided at the first base part and the second base part.

The base may comprise a first base part and a second base part, which are detachably coupled to each other, the inlet port comprises a pair of inlet ports, the outlet port comprises a pair of outlet ports, and the pair of inlet ports and the pair of outlet ports are respectively provided at the first base part and the second base part.

The passing cables may pass through the pair of through holes, and the fiber optics connection box further comprises gaskets to seal the through holes.

The pair of through holes may be opened toward the boundary line, by which the first base part and the second base part are partitioned, and the gaskets are disposed to seal the pair of through holes.

The base may be provided with a protrusion part, to which the support frame is mounted, and the pair of through holes is provided at the protrusion part.

The base may comprise a first base part and a second base part, which may be detachably coupled to each other, and the protrusion part comprises a first protrusion part and a second protrusion part respectively provided at the first base part and the second base part so that the first protrusion part and the second protrusion part can be coupled to each other.

At least one of the first and second protrusion parts may be provided with an airtightness member to seal.

At least one optical processing module may comprise a plurality of optical processing modules provided at a front of the support frame in a stacked state, the support frame is provided at a rear thereof with a receiving part for receiving the passing cables in an arranged state, and the receiving part comprises at least one holder integrally formed at the rear of the support frame.

The first base part and the second base part constituting the base may have a constraining means to prevent bottom boundary regions of the base from being separated from each other in a state in which the first base part and the second base part are assembled and fastened to each other.

The constraining means may comprise an extension projection formed so as to extend from one of the first and second base parts toward the other base part and a catching projection provided at the other base part to catch the extension projection.

The extension projection may be a T-shaped projection having branched front ends, and the catching projection is a pair of projections to catch the front ends of the extension projection.

The extension projection may comprise a pair of extension projections spaced apart from each other, and catching projection comprises two sets of catching projections provided at positions corresponding to the extension projections.

The base part at which the through holes may not be formed, which is one of the first and second base parts, is provided at an upper side and a lower side thereof in a thickness direction with blocking parts protruding toward the through holes to prevent dislocation of gaskets provided at the through holes.

And in accordance with an aspect of the present invention, the above and other objects can be accomplished by the provision a fiber optics connection box comprising a first base part and a second base part provided with a plurality of cable inlet ports and a plurality of cable outlet ports, fastening bosses being formed at the inlet ports and the outlet ports, the first base part and the second base part having different sizes, a cover fastened to the first base part and the second base part, the cover being configured to receive at least one optical processing module for splitting or splicing a cable introduced into a receiving space defined therein and sealing members, each of which has an inclined section formed at a side thereof to seal the inlet ports and the outlet ports, the sealing members being mounted to fastening bosses by fastening members in a state in which a portion of each of the sealing members is fitted in a through hole formed in a corresponding one of the fastening bosses.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Technology for extending an optical line to a subscriber via an optical network is realized in various ways, such as fiber to the home (FTTH), fiber to the office (FTTO), and fiber to the neighborhood (FTTN).

Various FTTH technologies have been developed. For example, for a passive optical network (POP), an optical line extends from an optical line terminal of a central office (CO) to a subscriber side, and the optical line is connected to an optical network unit or an optical network terminal of the subscriber side.

Upon comparison between the number of optical lines extending from the central office and the number of subscribers, however, the number of the subscribers is much greater than that of the optical lines. For this reason, it is necessary to divide the optical lines extending from the central office so that the number of the optical lines is equal to that of the subscribers. A fiber optics connection box serves to divide the optical lines.

Specifically, the optical line terminal, of the central office includes a plurality of light sources (not shown) for generating and outputting signal light of specific wavelengths. The signal light of different wavelengths output from the light sources is multiplexed and output. On the other hand, the fiber optics connection box splits or splices the multiplexed signal light supplied from the optical line terminal for each wavelength and transmits split or spliced signal light to the subscriber side. Hereinafter, a fiber optics connection box according to the present invention will be described in detail with reference to the accompanying drawings.

Figure 1:
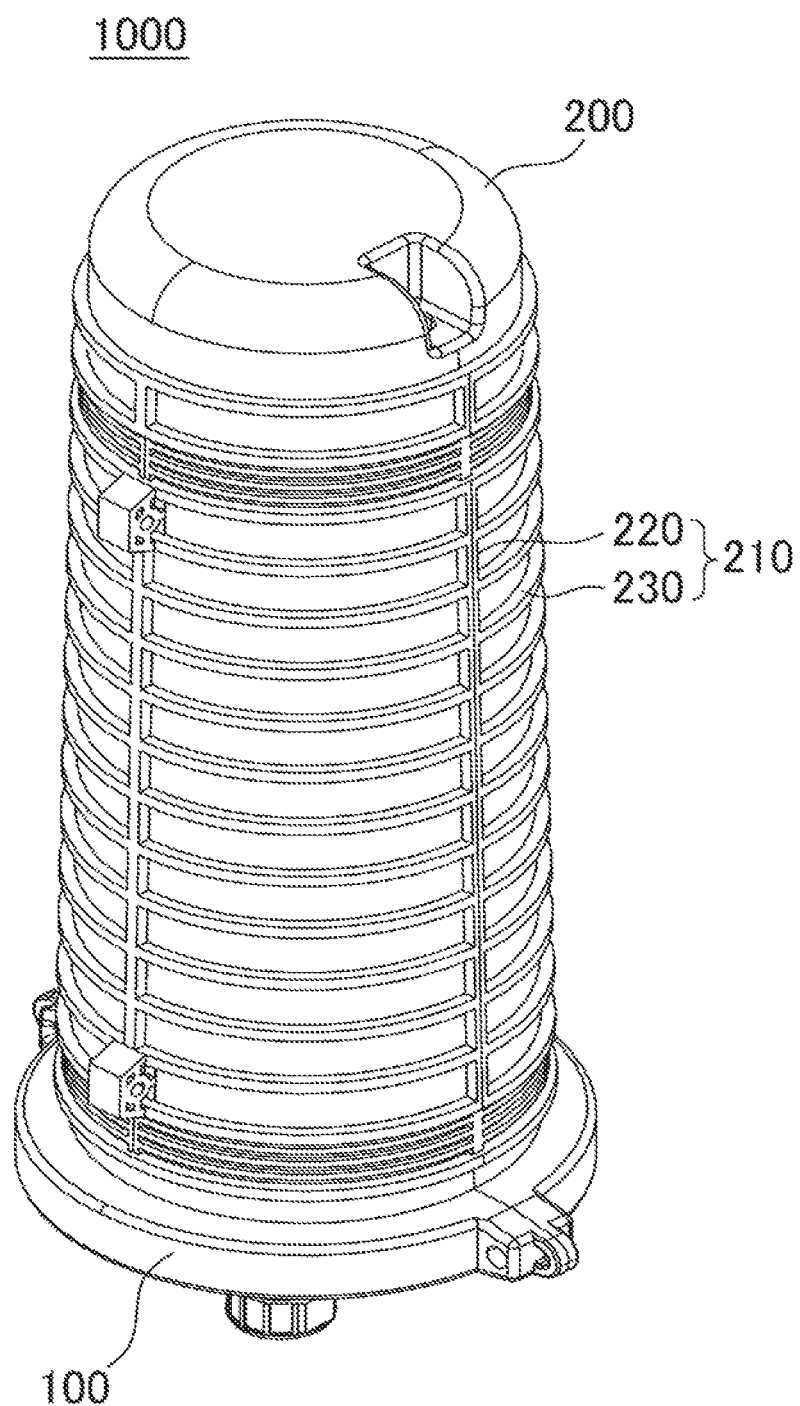
FIG. 1 is a perspective view showing a fiber optics connection box according to an embodiment of the present invention.

FIG. 1 is a perspective view showing the external appearance of a fiber optics connection box 1000 according to an embodiment of the present invention.

Referring to FIG. 1, the fiber optics connection box 1000 includes a cover 200 and a base 100 detachably connected to the cover 200.

The cover 200 has a receiving space defined therein. Various components of the fiber optics connection box, which will be described below, are received in the receiving space of the cover 200. It is preferable for the cover 200 to exhibit proper strength. Consequently, the cover 200 may be provided with a reinforcing rib 210 for increasing the strength of the cover 200. As shown in the drawing, the cover 200 may be provided at the outer circumference thereof with vertical ribs 220 and horizontal ribs 230 for increasing the strength of the cover 200.

Meanwhile, the base 100 may be detachably connected to the lower part of the cover 200 to selectively cover the receiving space of the cover 200. The base 100 may be connected to the cover 200 by fastening members, such as bolts. Hereinafter, various components received in the receiving space as well as the cover 200 will be described with reference to the accompanying drawings.

Figure 2:
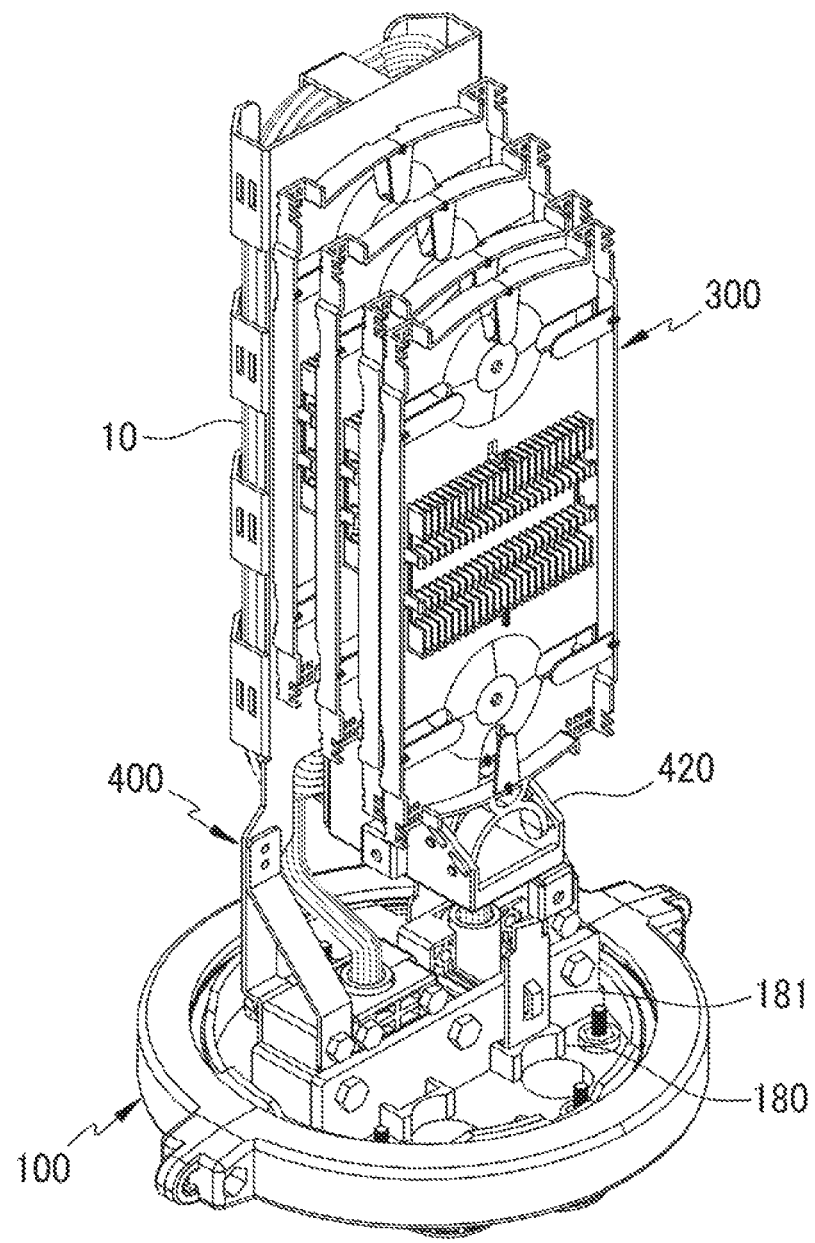
FIG. 2 is a perspective view showing the interior structure of the fiber optics connection box with a cover being removed from FIG. 1.
Figure 3:
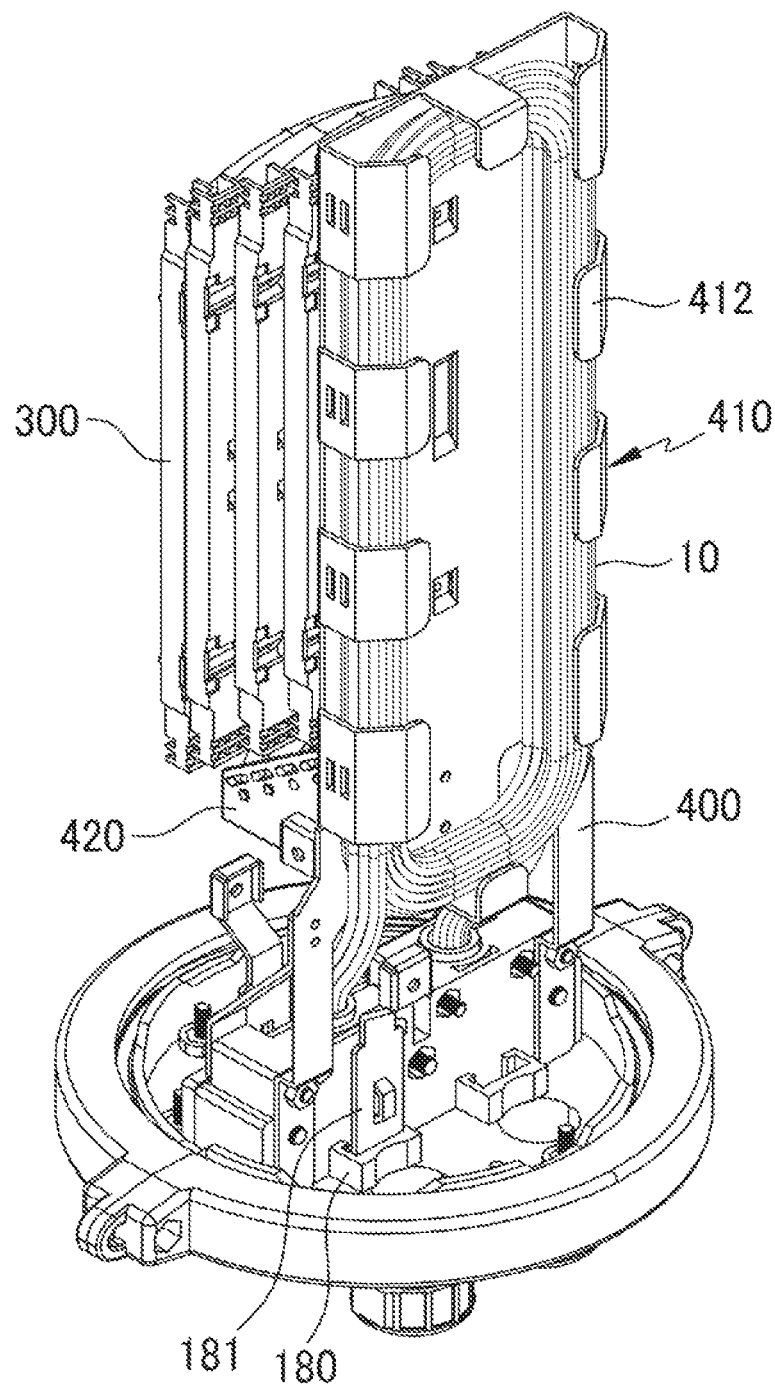
FIG. 3 is a rear perspective view of FIG. 2.

FIG. 2 is a perspective view showing the interior structure of the fiber optics connection box 1000 with the cover 200 being removed from FIG. 1, and FIG. 3 is a rear perspective view of FIG. 2.

Referring to FIGS. 2 and 3, the fiber optics connection box 1000 splits splices an introduced feeding cable into out cables and withdraws the out cables.

The fiber optics connection box according to the present invention includes a cover 200 having a receiving space defined therein, a base 100 having an inlet port through which a feeding cable is introduced, the inlet port having a fastening boss, an outlet port through which out cables are withdrawn, the outlet port having a fastening boss, and a pair of through holes through which a passing cable passes via the receiving space of the cover, the base 100 being provided to cover the receiving space, at least one optical processing module 300 provided in the receiving space to split or splice the feeding cable into the out cables, a support frame 400 mounted at the base to support the optical processing module, sealing members, which will be described below, to seal the inlet port and the outlet port, and fastening members, which will be described below, fastened into the fastening boss of the inlet port and the fastening boss of the outlet port in a state in which the sealing members are disposed at the inlet port and the outlet port. The fastening bosses are integrally formed at the base. The fastening bosses may protrude outward from the base.

The feeding cable may be an optical cable provided by the central office, and the out cables may be cables split or spliced by the fiber optics connection box.

The at least one optical processing module 300 for splitting or splicing the feeding cable (not shown) into the out cables is provided in the receiving space of the cover 200. Only one optical processing module 300 may be provided, or, as shown in the drawings, a plurality of optical processing modules 300 may provided in a stacked state based on the number of feeding cables.

In a case in which a plurality of optical processing modules 300 is provided, the optical processing modules 300 may be provided in a stacked state as shown in the drawings, since the receiving space is small.

The support frame 400 may be provided to support the optical processing module 300. A plurality of optical processing modules 300 may be disposed at the support frame 400 in a stacked state. The support frame 400 is fastened to the base 100. The support frame 400 includes a fastening part 420 to which the optical processing modules 300 are fastened.

The optical processing modules 300 may be mounted to the fastening part 420 so that the optical processing modules 300 can be folded. Consequently, an engineer may fold the optical processing modules 300 starting with the uppermost one to perform optical connection work with respect to a specific one of the optical processing modules 300.

The fastening part 420 may be inclined at a predetermined angle so that the optical processing modules 300 rotatably mounted to the fastening part 420 form predetermined steps at the end of the fastening part 420.

In a case in which the fastening part 420 is inclined at the predetermined angle, it is possible to increase the length of an inclined edge of the fastening part 420, to easily secure a space of the edge for forming a fastening hole, and to configure the fastening hole in the shape of a long hole. The long hole type fastening hole may improve ease of work after rotation or development of the respective optical processing modules 300.

Meanwhile, some of a plurality of optical cables, constituting a single cable, in the fiber optics connection box 1000 may be split or spliced by the optical processing modules in the fiber optics connection box, and the remaining optical cables may be withdrawn from the fiber optics connection box via the receiving space in the fiber optics connection box 1000.

Specifically, some of a plurality of optical cables constituting a single cable covered by the same covering material may be processed in the fiber optics connection box, and the remaining optical cables may be withdrawn from the fiber optics connection box without optical processing.

In this way, some of a plurality of optical cables constituting a single cable may be optically processed, and the remaining optical cables may pass through the receiving space of the fiber optics connection box. The cables passing through receiving space of the fiber optics connection box are defined as passing cables.

The passing cables, which are not processed by the optical processing modules, may be provided to another fiber optics connection box or to another consumer side merely via the fiber optics connection box 1000.

Some of the optical cables may be separated in the fiber optics connection box and then processed by the optical processing modules, and the remaining optical cables may be received in a receiving part 410 provided at the rear of the optical processing modules and then withdrawn from the fiber optics connection box 1000.

As previously described, the inner space of the fiber optics connection box 1000 is small. In a case in which the receiving part 410 is provided, therefore, it is necessary to arrange the passing cables 10 so that the passing cables do not interfere with other components while improving space utilization. For this reason, the fiber optics connection box 1000 according to this embodiment is configured so that the receiving part 410 is provided at the support frame 400 for supporting the optical processing modules 300.

Specifically, the receiving part 410 includes at least one holder 412 integrally formed at the rear of the support frame 400. That is, the above-mentioned fastening part 420 is provided at the front of the support frame 400 to support the optical processing modules 300, and the holder 412 is provided at the rear of the support frame 400 so that the passing cables 10 are wound and received in the receiving part 410 by the holder 412.

At least one holder 412 may be provided at the rear of the support frame 400. Preferably, a plurality of holders 412 is provided along the edge of the support frame 400 to more stably receive the passing cables and to prevent interference between the passing cables 10 and other components. Consequently, the passing cables 10 introduced into the fiber optics connection box 1000 may be received and arranged by the holders 412 and then withdrawn from the fiber optics connection box 1000 so that the passing cables 10 can be supplied to another fiber optics connection box or to another consumer side.

Also, as shown in FIGS. 2 and 3, guide parts 180 are further provided in the vicinity of the inlet port and the outlet port 172, 176, 174, and 178 (see FIGS. 4 and 5), i.e. at a region of the base 100. The guide parts 180 serve to fix the feeding cable and the out cables passing through the base 100 via the inlet or and the outlet port.

Specifically, a holding function to fix the respective cable is carried out by a cable holder 181 mounted to each of the guide parts 180. The guide parts 180 and the cable holders 181 will be described in detail below.

In FIG. 3, a connection relationship between the feeding cable introduced through the inlet port, having the fastening boss, through which the feeding cable is introduced, and the optical processing modules and between the out cables split or spliced from the feeding cables and the optical processing modules are omitted for the convenience of description.

Figure 4:
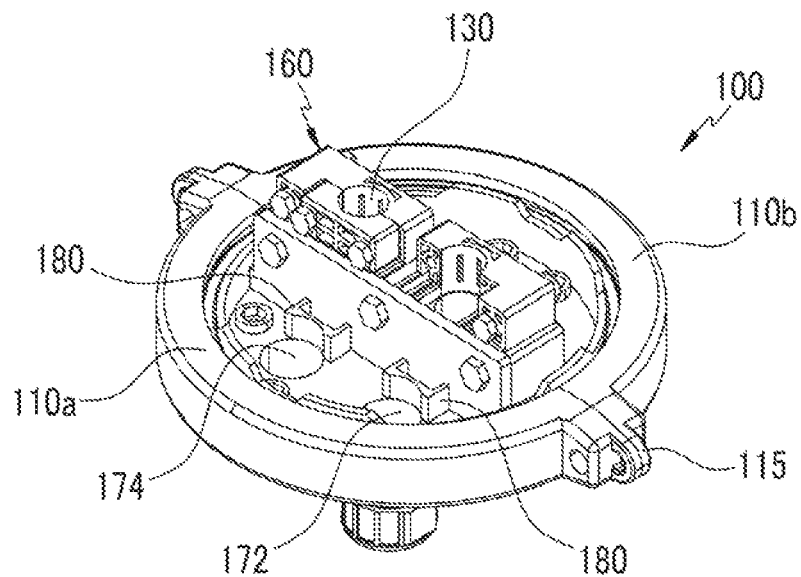
FIG. 4 is a perspective view of a base shown in FIG. 2.
Figure 5:
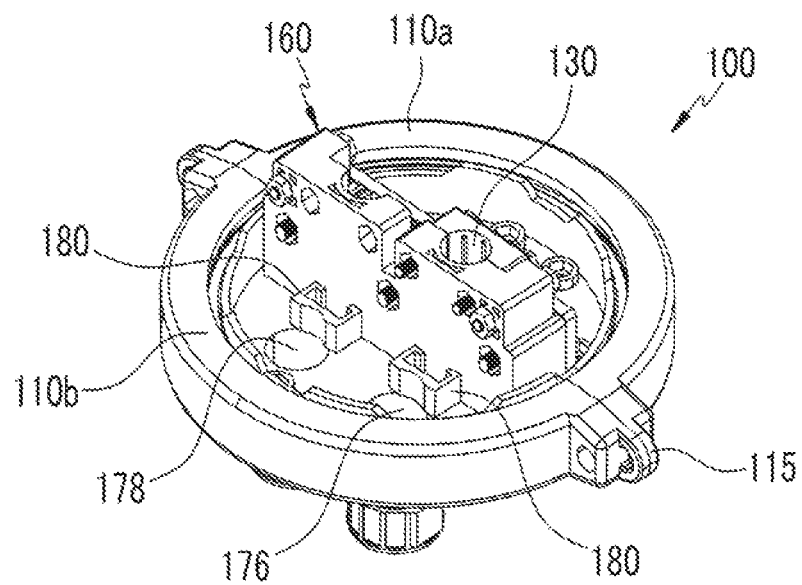
FIG. 5 is a perspective view of the base shown in FIG. 3.

FIG. 4 is a perspective view of the base 100 shown in FIG. 2 with the support frame 400 and the optical processing modules 300 provided above the base being removed, and FIG. 5 is a perspective view of the base 100 shown in FIG. 3 with the support frame 400 and the optical processing modules 300 provided above the base being removed.

Referring to FIGS. 4 and 5, the base 100 is detachably mounted to the cover 200 to cover the receiving space. In addition, the base 100 includes inlet ports 172 and 176, through which a feeding cable is introduced, outlet ports 174 and 178, through which out cables are withdrawn, and a pair of through holes 130, through which passing cables 10 pass. That is, the feeding cable, the out cables, and the passing cables 10 are introduced into the fiber optics connection box 1000 through the base 100, and, in the same manner, are withdrawn from the fiber optics connection box 1000 through the base 100.

The inlet ports 172 and 176 are regions through which the feeding cable is introduced, and the outlet ports 174 and 178 are regions through which the out cables are withdrawn. Alternatively, the inlet ports may not be formed at the base but the outlet ports may be formed at the base.

That is, in a case in which optical cables constituting the passing cables 10 do not need an additional feeding cable, the inlet ports 172 and 176, through which the feeding cable is introduced, may serve as output ports. That is, only the passing cables are provided as optical cables to be fed, and the openings denoted by reference numerals 172, 176, 174, and 178 except the through holes may serve as outlet ports.

For the convenience of description, however, the inlet ports, through which the feeding cable introduced, and the outlet ports, through which the out cables are withdrawn, may be separately provided.

Specifically, the base 100 may be provided approximately at the central part thereof with a pair of through holes 130. The pair of through holes 130 include an inlet through hole 130a (see FIG. 6), through which the passing cables 10 are introduced, and an output through hole 130b (see FIG. 6), through which the passing cables 10 are withdrawn. Also, the inlet ports and 176, through which the feeding cable is introduced, and the outlet ports 174 and 178, through which the out cables are withdrawn, may be provided at opposite sides of the through holes 130 so that the inlet ports 172 and 176 and the outlet ports 174 and 178 are spaced apart from the central part of the base 100 by a predetermined distance.

One of the inlet ports 172 and 174 and one of the outlet ports 174 and 178 may be provided. In order to increase processing capacity of the fiber optics connection box 1000, however, a plurality of inlet ports and a plurality of outlet ports may be provided. In this embodiment, two inlet ports 172 and 174 and two outlet ports 174 and 178 are provided. However, this construction is an example, and it is possible to properly change the number of the inlet ports and outlet ports.

In this embodiment, therefore, a pair of through holes 130 is arranged along the central part of the base 100, and one of the inlet ports 172 and 174 and one of the outlet ports 174 and 178 may be provided at each side of the through holes 130.

Meanwhile, the base 100 may be made of a single member. In a case in which the base 100 is made of a single member, however, it may be difficult to manufacture the base 100. Preferably, the base 100 is made of two or more members, which are connected to each other, to manage the cables passing through the base 100 upon maintenance of the fiber optics connection box 1000.

The base 100 may include a first base part 110a and a second base part 110b, which are detachably coupled to each other.

Figure 8:
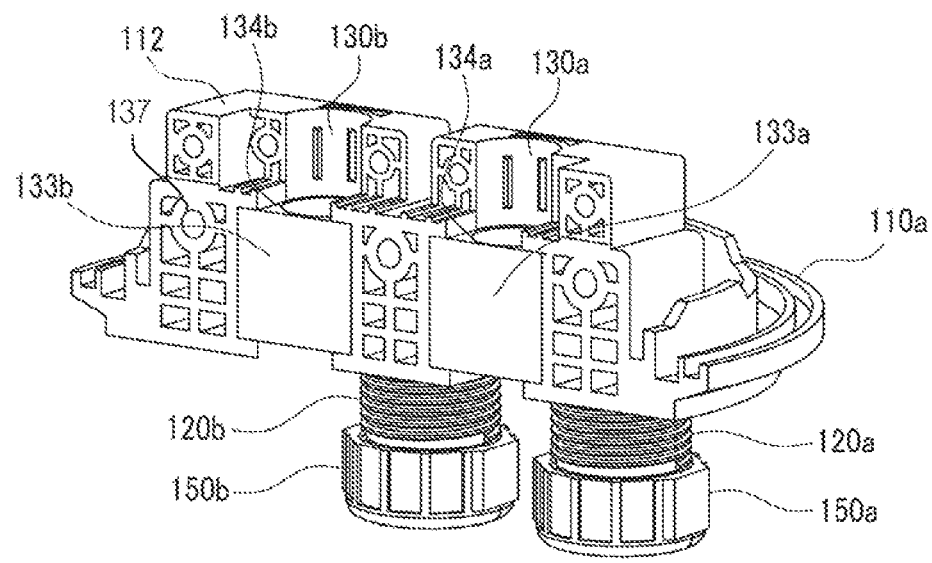
FIGS. 8 and 9 are perspective views respectively showing a first base part and a second base part constituting the base when the first base part and the second base part are separated from each other.
Figure 9:
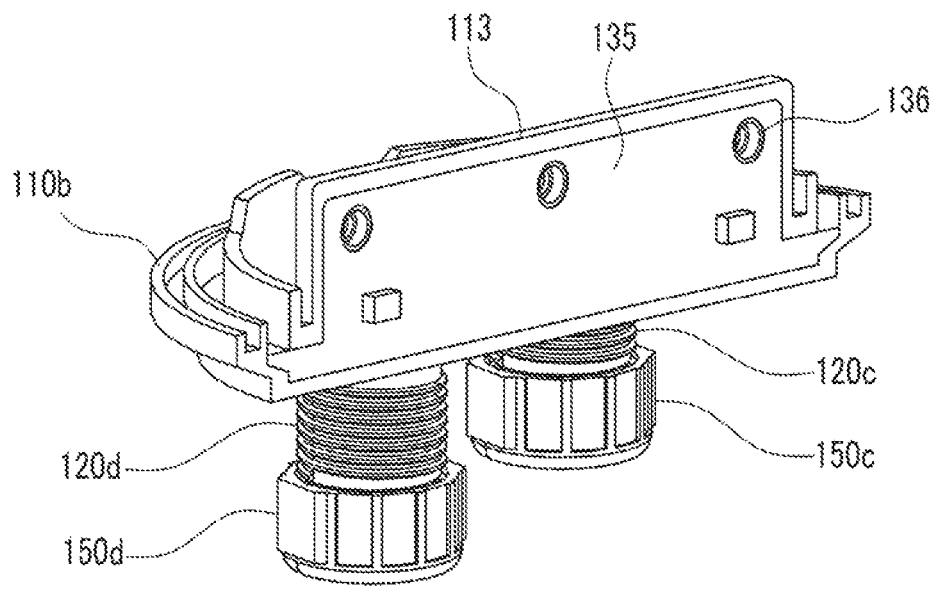

The first base part 110a and the second base part 110b may be fastened to each other by inserting bolts through first fastening holes 137 and second fastening holes 136 shown in FIGS. 8 and 9.

The base 100, in which the first base part 110a and the second base part 110b are fastened to each other by inserting bolts through the first fastening holes 137 and the second fastening holes 136, may be coupled to the cover 200 by fastening members 115.

Meanwhile, if the cables passing through the base 100 are separated from the base 100 when the first base part 110a and the second base part 110b of the base 100 are separated from each other, it is necessary for an engineer to fasten the cables to the base 100 upon re-assembly of the base 100.

In particular, in a case in which the through holes 130 are arranged along the interface between the first base part 110a and the second base part 110b, the passing cables disposed in the through holes 130 may be separated from the base 100 when the first base part 110a and the second base part 110b are separated from each other.

For this reason, it is necessary to fix the passing cables 10 in the through holes 130 upon assembly of the first base part 110a and the second base part 110b, which is inconvenient.

Consequently, the fiber optics connection box 1000 according to this embodiment provides a base structure for preventing the above-mentioned inconvenience, which will hereinafter be described in detail.

Figure 6:
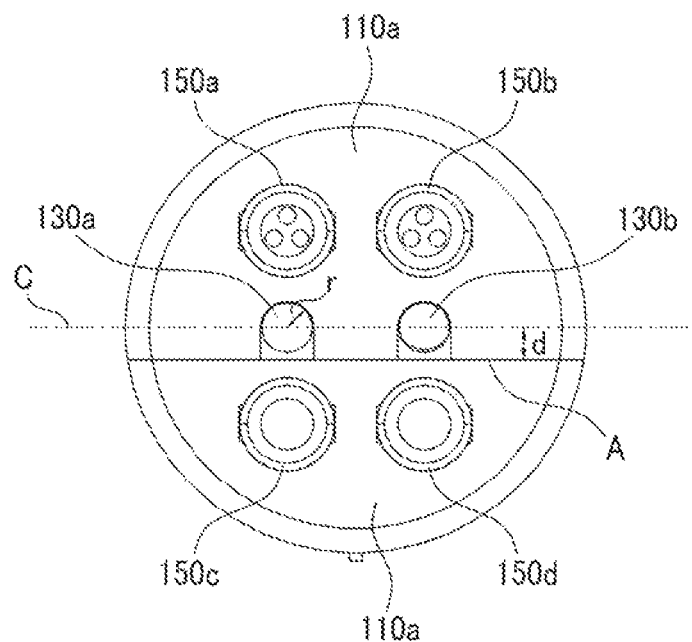
FIG. 6 is a bottom view of the base.
Figure 7:
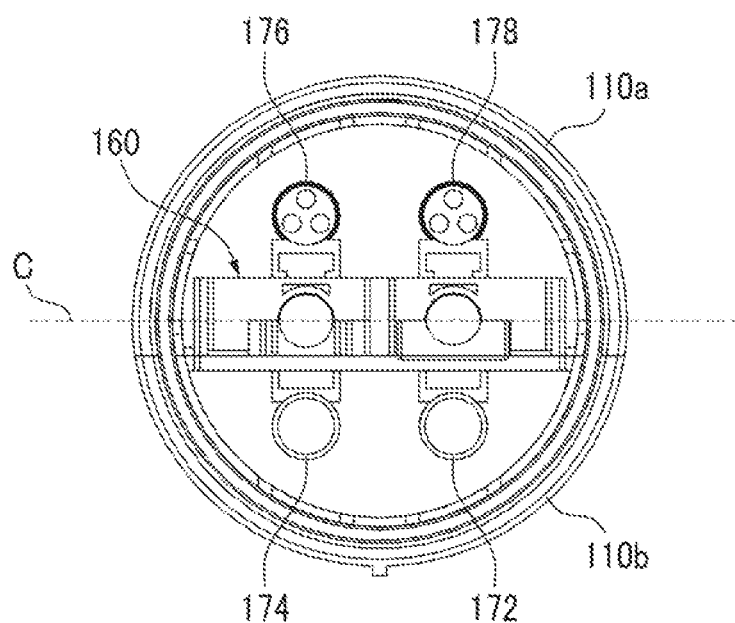
FIG. 7 is a plan view of the base.

FIG. 6 is a bottom view of the base 100, and FIG. 7 is a plan view of the base 100.

Referring to FIGS. 6 and 7, the base 100 includes the first base part 110a and the second base part 110b, which are selectively connected to each other. In this case, a pair of through holes 130a and 130b may be provided at the first base part 110a or the second base part 110b.

Specifically, the base 100 includes the first base part 110a and the second base part 110b, which can be separated from each other, and the pair of through holes 130a and 130b may be provided at the first base part 110a or the second base part 110b constituting the base 100.

Alternatively, the pair of through holes may be provided at the central part of the base so that the passing cables can be disposed at the support frame side along the shortest path without being curved.

The through holes 130a and 130b are provided at the first base part 110a or the second base part 110b constituting the base 100. The size of the first base part 110a may be different from that of the second base part 110b so that the through holes 130a and 130b can be provided at the central part (or central region) of the base 100.

That is, a boundary line A between the first base part 110a and the second base part 110b may be spaced apart from a center line C connecting centers of the through holes 130a and 130b of the base 100 by a predetermined distance d so that the boundary line A is eccentric from the center line C.

The predetermined distance d between the boundary line and the center line may be equal to or greater than a radius r of each of the through holes.

Since the pair of through holes 130a and 130b are provided at the central part (or the central region) of the base 100, the inlet ports 172 and 176 and the outlet ports 174 and 178 may be disposed around the through holes 130a and 130b.

That is, even in a case in which the first base part 110a and the second base part 110b are separated from each other, the through holes 130a and 130b are provided at the first base part 110a or the second base part 110b so that the passing cables 10 cannot be separated from the through holes 130.

In FIGS. 6 and 7, the pair of through holes 130a and 130b are shown as being provided at the first base part 110a, to which, however, the present invention is not limited. The pair of through holes 130a and 130b may be provided at the second base part 110b.

In this case, the boundary line A, by which the first base part 110a and the second base part 110b are partitioned from each other, is spaced apart from the through holes 130 by a predetermined distance. For example, as shown in the drawings, the boundary line A, by which the first base part 110a and the second base part 110b are partitioned from each other, is spaced apart from the center line C connecting the centers of the through holes 130a and 130b by a predetermined distance.

As previously described, the predetermined distance d between the center line C and the boundary line A may be equal to or greater than the radius r of each of the through holes. Even when the first base part 110a and the second base part 110b are separated from each other, therefore, the passing cables 10, fixed in the through holes 130a and 130b, are not separated from the through holes 130a and 130b.

Meanwhile, although not shown in the drawings, the through holes 130a and 130b are not provided at the first base part 110a or the second base part 110b, but the through holes 130a and 130b may be provided at the first base part 110a and the second base part 110b, respectively.

Meanwhile, in a case in which the through holes 130a and 130b are disposed as previously described, the inlet ports 172 and 176 and the outlet ports 174 and 178 may be provided at the first base part 110a and the second base part 110b, respectively.

That is, the pair of through holes 130a and 130b may be provided approximately at the central part of the base 100, and the inlet ports 172 and 176 and the outlet ports 174 and 178 may be provided at the upper and lower parts of the through holes 130, respectively.

In this case, the inlet ports 172 and 176 and the outlet ports 174 and 178 are provided at the first base part 110a or the second base part 110b. In a case in which the first base part 110a and the second base part 110b are separated from each other, therefore, the feeding cable and the out cables are prevented from being separated from the inlet ports 172 and 176 and the outlet ports 174 and 178.

Meanwhile, referring to FIGS. 4 and 5, the base 100 may further include a protrusion part 160, to which the support frame 400 is connected. That is, the support frame 400 for supporting the optical processing modules 300 is connected to the protrusion part 160 of the base 100 in a supported manner. In addition, the through holes 130 may be provided at the protrusion part 160.

That is, the protrusion part 160 is formed approximately at the central part of the base 100, and the through holes 130 are provided at the protrusion part 160. In a case in which the through holes 130 are provided at the protrusion part 160, it is possible to support the passing cables 10 passing through the through holes 130 by the height of the protrusion part 160. As previously described, the passing cables 10 are received in the receiving part 410 defined in the fiber optics connection box 1000. It is advantageous for the passing cables 10 to have directivity so that the passing cables 10 are directed to the receiving part 410 when the passing cables 10 pass through the base 100.

When the pasting cables 10 pass through the protrusion part 160 of the base 100, therefore, the passing cables 10 are fixed by the height the protrusion part 160, and, in addition, the passing cables 10 have directivity so that the passing cables 10 are directed to the receiving part provided thereabove. Consequently, it is possible to more easily receive the passing cables 10 in the receiving part 410.

Also, the guide parts 180 (see FIG. 2 or 3) may be further provided at a region of the base 100 adjacent to the inlet ports 172 and 176 and the outlet ports 174 and 178. The guide parts 180 are provided at the base 100 so that the guide parts 180 are adjacent to the inlet ports 172 and 176 and the outlet ports 174 and 178. Preferably, the guide parts 180 are provided at the base 100 in a state in which the guide parts 180 are in contact with the inlet ports 172 and 176 and the outlet ports 174 and 178.

The guide parts 180 serve to fix the feeding cable and the out cables passing through the base 100 via the inlet ports 172 and 176 and the outlet ports 174 and 178. The feeding cable, passing through the base 100, is connected to the optical processing modules 300 provided thereabove. Consequently, it is advantageous for the feeding cable to have directivity so that the feeding cable is directed above.

Consequently, the guide parts 180 may fix the feeding cable so that the feeding cable introduced through the inlet ports 172 and 176 has directivity so that the feeding cable is directed to the optical processing modules 300 provided thereabove. In the same manner, the out cables, directed form the optical processing modules 300 to the base 100 provided thereunder, are fixed by the guide parts 180 so that the out cables have directivity so that the out cables are directed to the outlet ports 174 and 178. Consequently, it is possible for an engineer to more easily insert the out cables into the outlet ports 174 and 178.

Specifically, the cable holders 181 (see FIG. 2 or 3) may be mounted to the guide parts 180 to hold the cables guided by the respective guide parts 180. The cable holders 181 may hold the cables using additional cable fixing members.

In a case in which the base 100 includes the first base part 110a and the second base part 110b, which are connected to each other, as previously described, the protrusion part 160 may include a first protrusion part 112 and a second protrusion part 113 respectively provided at the first base part 110a and the second base part 110b so that the first protrusion part 112 and the second protrusion part 113 can be coupled to each other. That is, when the first base part 110a and the second base part 110b constituting the base 100 are separated from each other, the first protrusion part 112 and the second protrusion part 113 constituting the protrusion part 160 may be separated from each other.

FIGS. 8 and 9 are perspective views respectively showing the first base part 110a and the second base part 110b when the first base part 110a and the second base part 110b are separated from each other.

Referring to FIGS. 8 and 9, the protrusion part 160 includes the first protrusion part 112 and the second protrusion part 113. The first protrusion part 112 is provided at the first base part 110a, and the second protrusion part 113 is provided at the second base part 110b. Meanwhile, fastening holes may be provided to increase coupling force between the first base part 110a and the second base part 110b when the first base part 110a and the second base part 110b are connected to each other.

That is, a first fastening hole 137 may be provided at the first base part 110a, and a second fastening hole 136 corresponding to the first fastening hole 137 may be provided at the second protrusion part 113. Bolts may be inserted through the first fastening hole 137 and the second fastening hole 136 to interconnect the first base part 110a and the second base part 110b.

The first base part 110a and the second base part 110b may be connected to each other through the first fastening hole 137 and the second fastening hole 136, and, in addition, foreign matter, such as moisture, may be prevented from infiltrating into the fiber optics connection box 1000, thereby improving airtightness of the fiber optics connection box 1000.

Meanwhile, the passing cables 10 pass through the pair of the through holes 130, and the fiber optics connection box 1000 further includes gaskets 133a and 133b to seal the through holes 130. The fiber optics connection box 1000 includes the optical processing modules 300, and the electronic parts have a low resistance to moisture.

For this reason, it is necessary to prevent moisture from infiltrating into the fiber optics connection box 1000 upon assembly of the fiber optics connection box 1000. To this end, it is necessary to provide sealing parts at the openings so that infiltration of moisture is prevented by the sealing parts. The through holes 130, provided at the base 100, may form a path, along which moisture infiltrates into the fiber optics connection box 1000. Consequently, it is necessary to prevent infiltration of moisture so that only the passing cables 10 can be inserted through the through holes 130.

The gaskets 133a and 133b are respectively provided in the pair of through holes 130 to form a path, through which the passing cables 10 pass. In addition, the gaskets 133a and 133b serve to prevent infiltration of moisture through the through holes 130. The gaskets 133a and 133b are disposed in the respective through holes 130. The gaskets 133a and 133b may be provided at the insides of through holes 134a and 134b, through which the passing cables 10 pass.

The diameter of the through holes 134a and 134b may be equal to or less than that of the passing cables 10 to prevent infiltration of moisture through spaces defined between the gaskets 133a and 133b and the passing cables 10.

Also, waterproof grease is applied into spaces defined between the gaskets 133a and 133b and the through holes 130 and into the through holes 134a and 134b to prevent infiltration of moisture through the above-defined spaces.

Meanwhile, in a case in which the gaskets 133a and 133b are provided in the through holes 130, the gaskets 133a and 133b may be provided between the first base part 110a and the second base part 110b for easy assembly. That is, as shown in the drawings, the gaskets 133a and 133b are inserted into the through holes 130 in a state in which the first base part 110a and the second base part 110b are separated from each other, and then the first base part 110a and the second base part 110b are connected to each other, thereby achieving easy assembly. In this case, one side of the gaskets 133a and 133b may be supported by the through holes 130 provided at the first protrusion part 112, and the other side of the gaskets 133a and 133b may be supported by the second protrusion part 113.

In conclusion, the pair of through holes 130a and 130b may be opened toward the boundary line A, by which the first base part 110a and the second base part 110b are partitioned, and the gaskets 133a and 133b may be disposed to seal the pair of through holes 130a and 130b.

Meanwhile, in the above construction, moisture may infiltrate through a space defined between the first protrusion part 112 and the second protrusion part 113 when the first base part 110a and the second base part 110b are connected to each other. For this reason, the fiber optics connection box 1000 according to this embodiment may include an airtightness member 135 to seal provided at least one of the first and second protrusion parts 112 and 113.

To distinguish the airtightness member 135 from sealing members 140, which will be described below, to seal the inlet ports 172 and 176 and the outlet ports 174 and 178, a sealing material provided at least one of the first and protrusion parts 112 and 113 is referred to as the airtightness member 135.

The first protrusion part 112 and the second protrusion part 113 may have corresponding surfaces facing each other, and the airtightness members 135 may be provided at the corresponding surfaces. Consequently, the through holes 130 may be sealed by the gaskets 133a and 133b and the waterproof grease, and the space defined between the first base part 110a and the second base part 110b may be sealed by the airtightness members 135, thereby preventing infiltration of moisture.

Meanwhile, as previously described, the base 100 includes the inlet ports 172 and 176, through which the feeding cable is introduced, and the outlet ports 174 and 178, through which the out cables are withdrawn. Consequently, a means to seal the inlet ports 172 and 176 and the outlet ports 174 and 178 is necessary.

The sealing means includes sealing members 140 to seal the inlet ports 172 and 176 and the outlet ports 174 and 178 and fastening members 150 fastened to the inlet ports 172 and 176 and the outlet ports 174 and 178 in a state in which the sealing members 140 are disposed between the fastening members 150 and the inlet ports 172 and 176 and between the fastening members 150 and the outlet ports 174 and 178. Hereinafter, the means to seal the inlet ports 172 and 176 and the outlet ports 174 and 178 will be described in detail with reference to the accompanying drawings.

Figure 10:
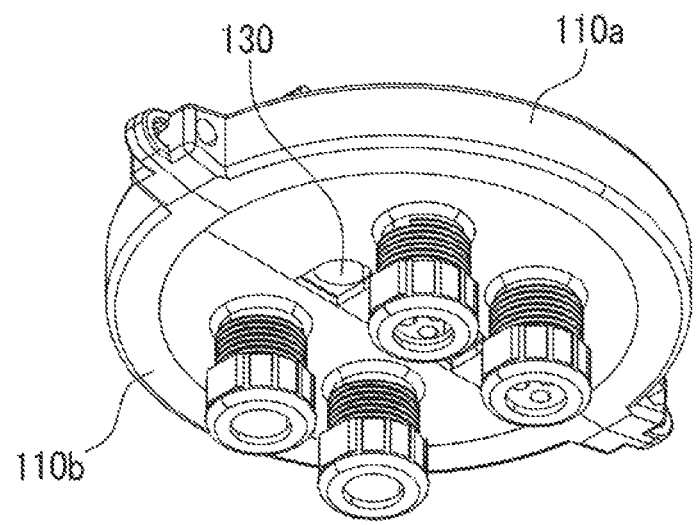
FIG. 10 is a bottom perspective view of the base.
Figure 11:
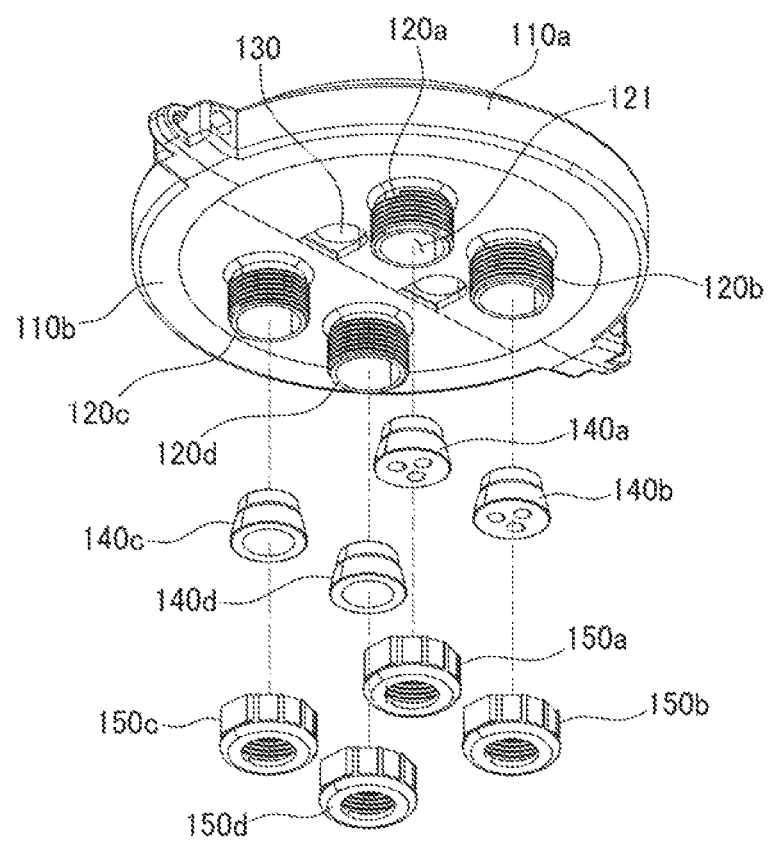
FIG. 11 is an exploded perspective view showing a state in which sealing members and fastening members shown in FIG. 10 are separated from each other.

FIG. 10 is a bottom perspective of the base, and FIG. 11 is an exploded perspective view showing a state in which fastening members 150a, 150b, 150c, and 150d and sealing members 140a, 140b, 140c, and 140d shown in FIG. 10 are separated from each other.

Referring to FIGS. 10 and 11, the inlet ports 172 and 176 and the outlet ports 174 and 178 of the base 100 are provided with fastening bosses 120a, 120b, 120c, and 120d, to which the fastening members 150 are fastened. Each of the fastening bosses 120a, 120b, 120c, and 120d has a screw formed at the outer circumference thereof. The fastening bosses 120a, 120b, 120c, and 120d protrude outward from the bottom of the base 100. Each of the fastening bosses 120a, 120b, 120c, and 120d has a through hole 121, into which a corresponding one of the sealing members 140 is inserted.

Meanwhile, the fastening bosses 120a, 120b, 120c, and 120d are integrally formed at the base 100.

The fastening bosses 120a, 120b, 120c, and 120d may be configured to extend from the inlet ports 172 and 176 and the outlet ports 174 and 178 toward the opposite side of the receiving space of the cover 200. The inlet ports 172 and 176 and the outlet ports 174 and 178 are provided at the base 100, and the through holes 121 are provided at the fastening bosses 120a, 120b, 120c, and 120d. Consequently, each of the inlet ports 172 and 176 and a corresponding one of the through holes 121 may be treated as a single communication hole.

In a case in which the fastening members 150 and the sealing members 140 are provided to seal the inlet ports 172 and 176 and the outlet ports 174 and 178, the fastening bosses, to which the fastening members 150 are to be fastened, are necessary. If the fastening bosses are provided separately from the base, however, it is necessary to couple the fastening bosses to the base and to couple the fastening members to the fastening bosses, which is complicated and troublesome.

In particular, in a case in which the fastening bosses protrude outward from the base via the inlet ports and the outlet ports, efficiency of connection between the fastening bosses, the cables, and the sealing members is lowered. That is, a detachable fastening boss having high airtightness and sealing efficiency is expensive and has difficulty in securing airtightness as compared with the fastening bosses according to the present invention.

Consequently, the fastening bosses necessary for achieving sealing of the inlet ports and the outlet ports and, at the same time, fastening of the inlet ports and the outlet ports are not separately provided but are integrally formed at the base, thereby greatly reducing product cost.

In this embodiment, therefore, the fastening bosses 120a, 120b, 120c, and 120d are integrally formed at the base 100 in order to solve the above-mentioned complexity and troublesomeness and to improve assembly efficiency. Consequently, it is possible for an engineer to insert the sealing members 140 through the through holes 121 of the fastening bosses 120a, 120b, 120c, and 120d and to fasten the fastening members 150 to the fastening bosses 120a, 120b, 120c, and 120d, thereby easily achieving assembly.

Meanwhile, the sealing members 110 are inserted into the through holes 121 of the fastening bosses 120a, 120b, 120c, and 120d, and the fastening members 150 are fastened to the fastening bosses 120a, 120b, 120c, and 120d.

Consequently, predetermined pressure is applied to the sealing members 140 by fastening force between the fastening members 150 and the fastening bosses 120a, 120b, 120c, and 120d to achieve sealing. However, it may be necessary to separate the feeding cable or the out cables from the inlet ports 172 and 176 or the outlet ports 174 and 178 for maintenance.

In this case, if the sealing members 140 are fully fitted in the through holes 121 of the fastening bosses 120a, 120b, 120c, and 120d, it may be difficult to separate the sealing members 140 from the fastening bosses 120a, 120b, 120c, and 120d. In particular, predetermined pressure is applied to the sealing members 140 by the coupling force between the fastening members 150 and the fastening bosses 120a, 120b, 120c, and 120d. Consequently, if sealing members 140 are fully fitted in the through holes 121 of the fastening bosses 120a, 120b, 120c, and 120d, it may be difficult to separate the sealing members 140 from the fastening bosses 120a, 120b, 120c, and 120d.

In order to solve the above problem, therefore, this embodiment is configured so that the sealing members 140 are inserted into the through holes 121 of the fastening bosses 120a, 120b, 120c, and 120d by a predetermined length.

In other words, it is preferable for each of the sealing members, mounted to the fastening bosses of the inlet port or the outlet port to seal the cables in the fiber optics connection box, to have a inclined portion in which the outer diameter of each of the sealing members is changed.

Therefore, the insertion depth of the sealing members is restricted or sealing effects are maximized during a fastening process using the fastening members, since a portion of each of the sealing members is inserted into a corresponding one of the fastening bosses.

That each of the sealing members has a inclined portion in which the outer diameter of each of the sealing members is inclined means that the side of each of the sealing members is inclined.

Each of the sealing members 140 has a section in which the side of each of the sealing members 140 is inclined to seal the inlet ports and the outlet ports. The sealing members 140 are mounted to the fastening bosses by the fastening members in a state in which the sealing members 140 are partially inserted in the through holes of the fastening bosses.

Hereinafter, the construction of one of the sealing members 140 will be described in detail with reference to FIG. 12.

Figure 12A:
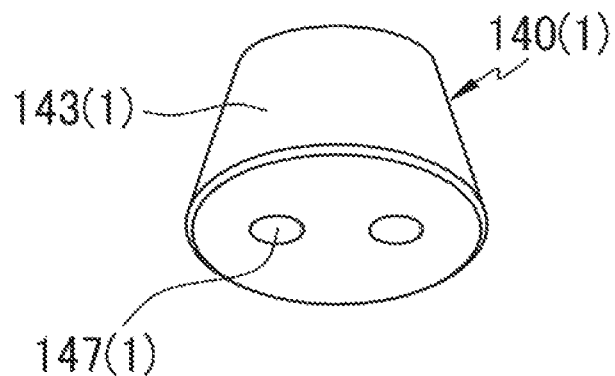
FIGS. 12A to 14B are perspective and side sectional views showing various embodiments of the sealing member.
Figure 12B:
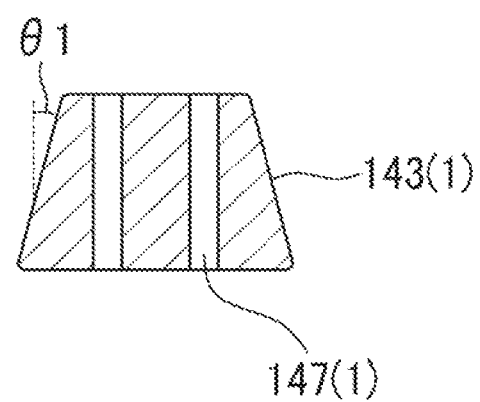

FIG. 12A is a perspective view showing a sealing member 140(1) according to an embodiment, and FIG. 12B is a side sectional view of FIG. 12A.

Referring to FIGS. 12A and 12B, the sealing member 140(1) is made of an elastic material exhibiting predetermined elasticity. The sealing member 140(1) has the following shape. The sealing member 140(1) has through holes 147(1), through which a feeding cable or an out cable passes. Two through holes 147(1) are shown in the drawings. However, the number of the through holes 147(1) may be appropriately adjusted.

For example, only one through hole 147(1) may be provided, or three or more through holes 147(1) may be provided. That is, the number of the through holes 147(1) is appropriately adjusted based on the diameter of a cable or the number of strands of the cable.

In the sealing member shown in FIGS. 12A and 12B, the inclined portion may be formed at the whole portion of the sealing member.

In section, the side of the sealing member 140(1) is inclined at a predetermined angle $\theta 1$ to a line perpendicular thereto. Consequently, the sealing member 140(1) may be formed approximately in a trapezoidal shape in section as shown in the drawings.

Also, the inclined shape may be configured so that the diameter of the bottom of the sealing member 140(1) is greater than that of the top of the sealing member 140(1). When the sealing member 140(1) is inserted into each of the fastening bosses 120a, 120b, 120c, and 120d, therefore, the sealing member 140(1) is prevented from being inserted into each of the fastening bosses 120a, 120b, 120c, and 120d to more than a predetermined depth by the inclined side of the sealing member 140(1).

The angle $\theta 1$ may be appropriately set to prevent the sealing member 140(1) from being inserted into each of the fastening bosses 120a, 120b, 120c, and 120d to more than the predetermined depth. That is, the angle $\theta 1$ is set so that the sealing member 140(1) cannot be inserted into each of the fastening bosses 120a, 120b, 120c, and 120d to more than the predetermined depth when predetermined pressure is applied to the sealing member 140(1) by the coupling force between the fastening members 150 and the fastening bosses 120a, 120b, 120c, and 120d. Experiments carried out by the inventors of the present application revealed that, when the angle $\theta 1$ is greater than 0 to 60 degrees (an inclined plane of 60 degrees or less), the full insertion of the sealing member 140(1) is prevented by the side inclination of the sealing member 140(1), and, at the same time, sealing force is increased when fastening force is applied by the fastening members. Preferably, the angle $\theta 1$ is between approximately 5 degrees and 30 degrees.

However, pressure generated by fastening force between the fastening members 150 and the fastening bosses 120a, 120b, 120c, and 120d is applied to the sealing members 140(1). As a result, the sealing member 140(1) may be fully inserted into each of the fastening bosses 120a, 120b, 120c, and 120d by such fastening force, although the sealing member 140(1) has the above-mentioned inclined shape. For this reason, a construction for preventing the sealing member 140(1) from being inserted into each of the fastening bosses 120a, 120b, 120c, and 120d to more than the predetermined depth may be provided.

Figure 13A:
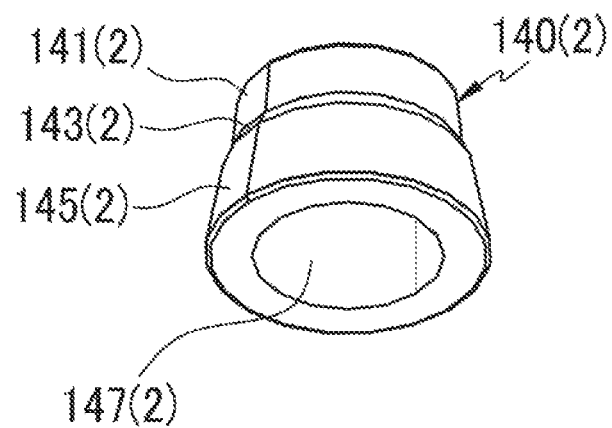
Figure 13B:
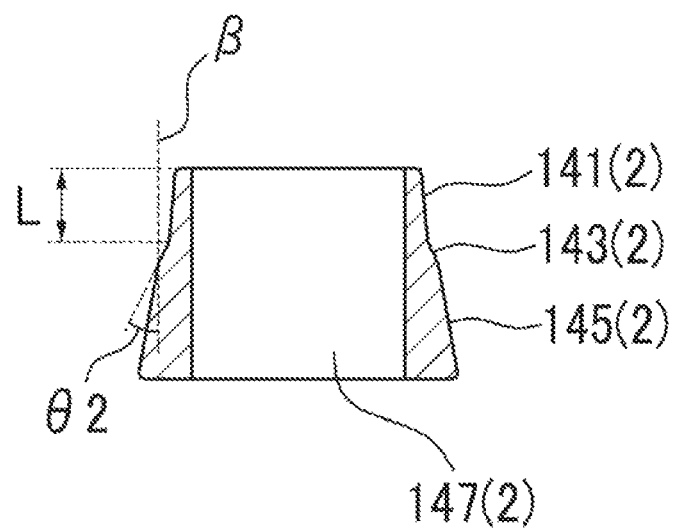

FIGS. 13A and 13B are views showing a sealing member 140(2) according to another embodiment.

Referring to FIG. 13, the sealing member 140(2) according to this embodiment is different from the sealing member according to the previous embodiment in that the sealing member 140(2) is further provided at the outer circumference thereof with a step part 143(2). That is, at the side of the sealing member 140(2), the sealing member 140(2) may include a first region 141(2), which is inserted into each of the fastening bosses 120a, 120b, 120c, and 120d, a step part 143(2) for preventing the sealing member 140(2) from being further inserted into each of the fastening bosses 120a, 120b, 120c, and 120d, and a second region 145(2), to which fastening between each of the fastening members 150 and a corresponding one of the fastening bosses 120a, 120b, 120c, and 120d is transmitted.

In order to more effectively prevent damage to the fastening bosses, which may occur due to ambiguous restriction of insertion depth, during a fastening process or to more effectively prevent excessive insertion of the sealing member during an insertion process, the sealing member may be provided with a inclined portion in which the outer diameter of the sealing member is changed, and, in addition, the inclined portion, i.e. the inclined plane of the sealing member may include the step part 143(2) at which an inclination angle between the outer circumference of the sealing member and a line perpendicular thereto is increased and then decreased (or decreased and then increased).

Although the step part 143(2) is omitted, sealing efficiency may be improved, and the insertion depth of the sealing member may be restricted to some extent. However, if excessive fastening force is applied during a process of mounting the fastening members, the insertion depth of the sealing member may be excessively increased with the result that the fastening bosses may be damaged although the sealing member is provided at the side thereof with the inclined section.

The step part 143(2) is formed along the outer circumference of the sealing member 140(2). In a case in which an insertion length L, by which the sealing member 140(2) is inserted, into each of the fastening bosses 120a, 120b, 120c, and 120d, is set, the step part 143(2) is formed at the sealing member 140(2) so that the step part 143(2) is spaced apart from the upper end of the sealing member 140(2) by the insertion length L.

Also, the step part 143(2) is configured to have a predetermined angle $\theta 2$ with respect to a perpendicular line B. The angle $\theta 2$ is set so that the sealing member 140(2) cannot be inserted into each of the fastening bosses 120a, 120b, 120c, and 120d to more than a depth corresponding to the step part 143(2) by the step part 143(2) of the sealing member 140(2) when predetermined pressure is applied to the sealing member 140(2) by the coupling force between the fastening members 150 and the fastening bosses 120a, 120b, 120c, and 120d. Experiments carried out by the inventors of the present application revealed that, when the angle of the step part 143(2) is greater than 0 to 60 degrees, insertion of the sealing member 140(2) is prevented by the step part 143(2). Preferably, the angle $\theta 2$ is between approximately 5 degrees and 30 degrees.

Meanwhile, the sealing member 140(2) may be configured so that the first region 141(2) and the second region 145(2), between which the step part 143(2) is located, have the same gradient or different gradients. That is, the first region 141(2) is a region which is inserted into each of the fastening bosses 120a, 120b, 120c, and 120d, and may have an angle of greater than 0 to 60 degrees with respect to the perpendicular line so that the first region 141(2) can be more easily inserted into each of the fastening bosses 120a, 120b, 120c, and 120d. The second region 145(2) may have an angle equal to that of the first region 141(2). Alternatively, the second region 145(2) may have an angle greater than or less than that of the first region 141(2).

The sealing member 140(2) according to this embodiment is provided only a single through hole 147(2). However, a plurality of the through holes 147(2) may be provided. That is, the number of through holes 147(2) may be appropriately changed.

In the sealing member having the step part, the angle range may overlap between the respective sections of the sealing member. Preferably, however, the inclination angle of the step part 143(2) may be greater than that of the first region 141(2) or the second region 145(2) within the above-defined angle range. The inclination angles of the first region 141(2) and the second region 145(2) may be set within the above-defined angle range as needed.

Figure 14A:
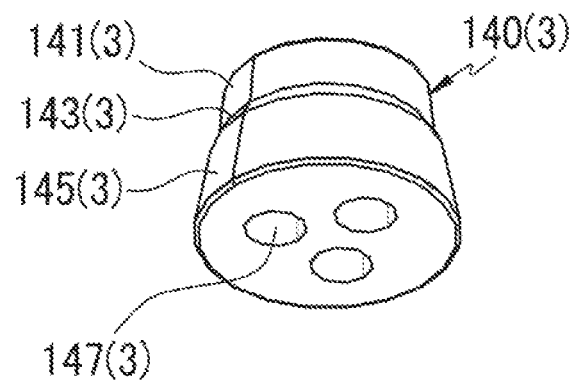
Figure 14B:
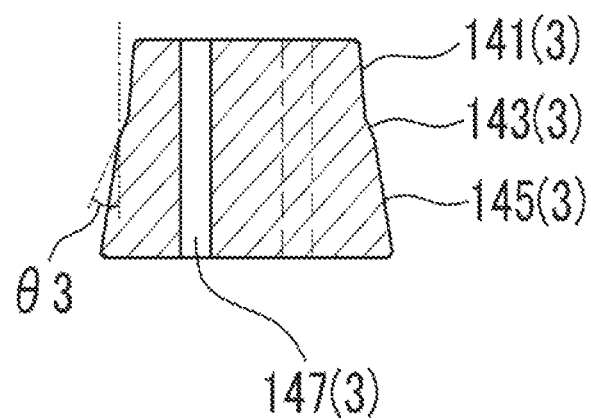

FIGS. 14A and 14B are views showing a sealing member 140(3) according to yet another embodiment.

In comparison with FIGS. 13A and 13B, the sealing member 140(3) according to this embodiment is different from the sealing member shown in FIGS. 13A and 13B in that the sealing member 140(3) has two or more, e.g. three, through holes 147(3), through which the feeding cable or the out cables pass. This is because cables may have different diameters and different numbers of strands according to kinds of the cables. The sealing member 140(3) includes a first region 141(3), a step part 143(3), and a second region 145(3). An angle $\theta 3$ formed by the step part 143(3) is similar to that described with reference to FIGS. 13A and 13B, and therefore, a description thereof will be omitted.

Figure 15:
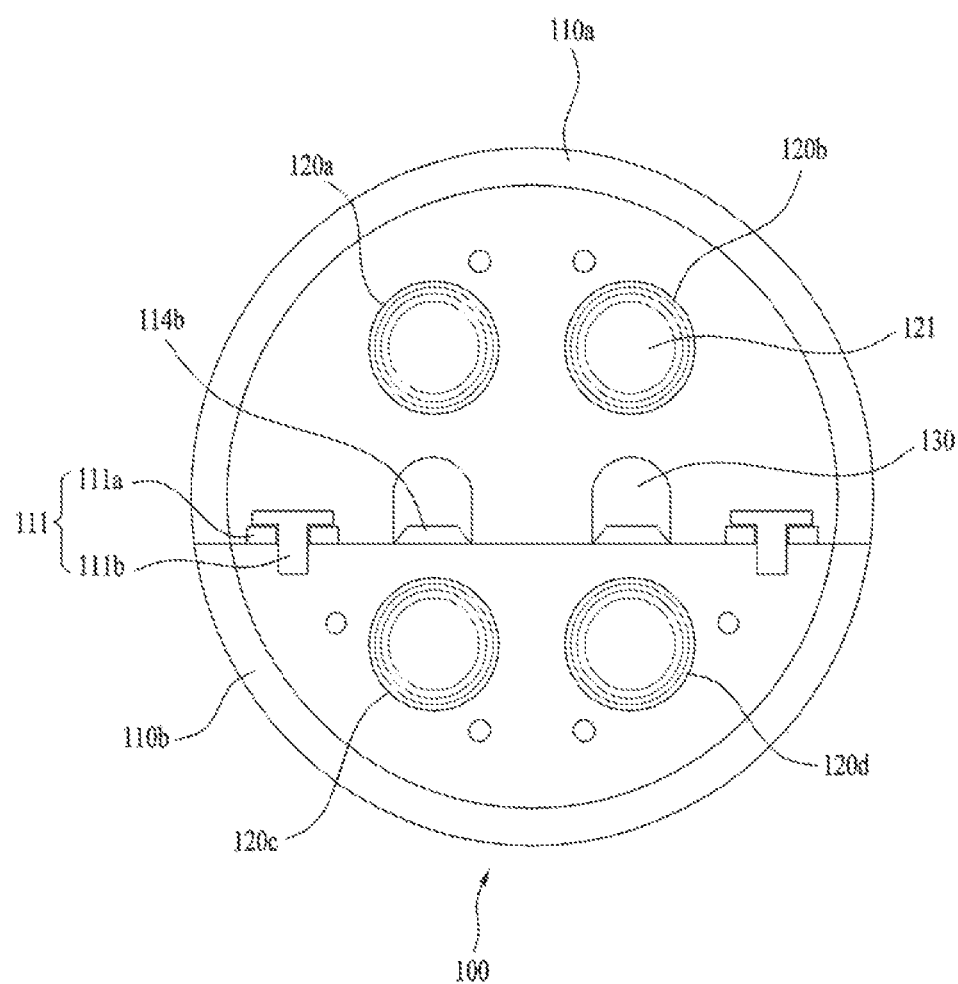
FIG. 15 is a bottom view showing a base of another embodiment of the fiber optics connection box according to the present invention.

FIG. 15 is a bottom view showing a base of another embodiment of the fiber optics connection box according to the present invention.

As shown in FIG. 4, the first base part 110a and the second base part 110b constituting the base 100 may be fastened to each other at the protrusion part 160 (see FIGS. 4, 5, 8, and 9) by bolts (not shown) in a state in which the first base part 110a and the second base part 110b are assembled.

That is, as shown in FIGS. 4, 5, 8, and 9, the first base part 110a and the second base part 110b constituting the base 100 may be fastened to each other by inserting bolts through the first fastening hole 137 and the second fastening hole 136 formed at the protrusion part 160 of the first and second base parts 110a and 110b.

Also, the cover 200 may be fastened and assembled to the assembled base 100 by the fastening members 115.

In a case in which the first and second base parts 110a and 110b are assembled by inserting bolts through the first fastening hole 137 and the second fastening hole 136 formed at the first protrusion part 112 and the second protrusion part 113 of the first and second base parts 110a and 110b shown in FIGS. 8 and 9, the boundary regions of the first and second base parts 110a and 110b of the bottom of the base 100 may be separated from each other by fastening force applied to the first protrusion part 112 and the second protrusion part 113.

As previously described, the airtightness member 135 to seal at least one of the first and second protrusion parts 112 and 113 may be provided at the at least one of the first and second protrusion parts 112 and 113. Pressure may be applied to the first and second base parts 110a and 110b, which are fastened to each other, so that the portions of the first and second base parts 110a and 110b distant from the fastening holes 137 and 136, i.e. the bottom boundary regions of the base 100, are separated from each other by the airtightness member disposed therebetween.

Consequently, it is necessary to prevent the bottom boundary regions of the base from being separated from each other due to fastening between the first protrusion part 112 and the second protrusion part 113.

The base 100 of the fiber optics connection box shown in FIG. 15 may include a constraining means 111 to prevent the bottom boundary regions of the base from being separated from each other in a state in which the first base part 110a and the second base part 110b constituting the base 100 are assembled and fastened to each other.

The constraining means 111 prevents the bottom boundary regions of the base from being separated from each other when the protrusion parts 112 and 113 of the first base part 110a and the second base part 110b constituting the base 100 are fastened to each other.

That is, during the assembly process, the constraining means 111 constrains the bottom boundary regions of the first base part 110a and the second base part 110b, which are fastened to each other by bolts, so that the bottom boundary regions of the first base part 110a and the second base part 110b are not separated from each other.

The constraining means 111 may include an extension projection 111b formed so as to extend from one of the first and second base parts 110a and 110b toward the other of the first and second base parts 110a and 110b and a catching projection 111a provided at the other of the first and second base parts 110a and 110b to catch the extension projection 111b.

Figure 16:
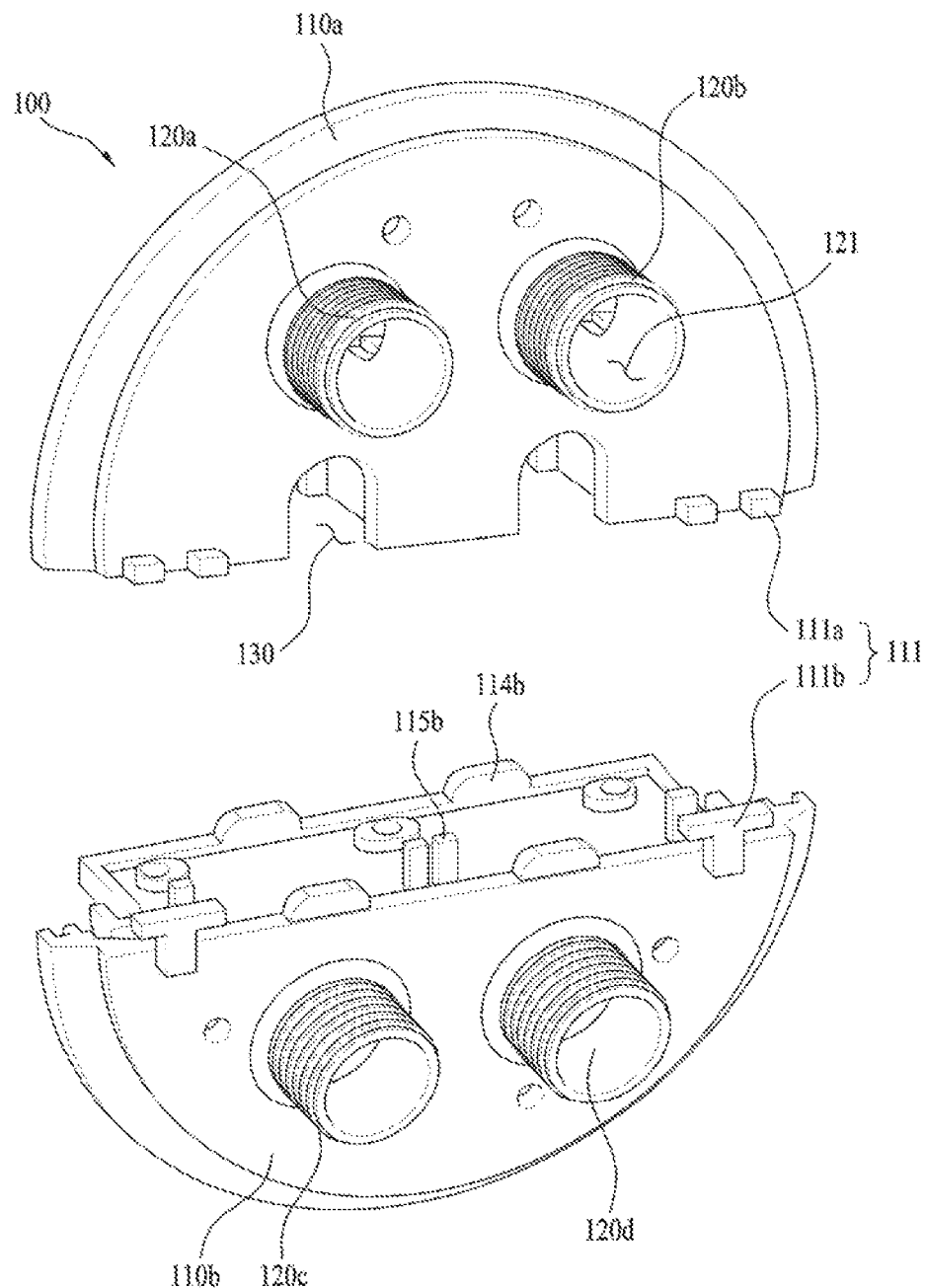
FIG. 16 is an exploded perspective view of the base 100 shown in FIG. 15.

FIG. 16 is an exploded perspective view of the base 100 shown in FIG. 15.

In the embodiment shown in FIG. 16, the extension projection 111b constituting the constraining means 111 is shown as extending from the bottom of the second base part 110b, at which the through holes 130 are not formed, toward the first base part 110a.

Specifically, in the embodiment shown in FIGS. 15 and 16, the extension projection 111b may be a T-shaped projection having branched front ends, and the catching projection 111a may be a pair of projections to catch the front ends of the extension projection 111b.

As shown in FIGS. 15 and 16, a pair of extension projections 111b may be provided so that the extension projections 111b are spaced apart from each other. Correspondingly, two sets of catching projections 111a may be provided at positions corresponding to the extension projections 111b.

When the first base part 110a and the second base part 110b are assembled so that the first base part 110a and the second base part 110b are fastened to each other, therefore, the upper ends of the extension projections 111b provided at the second base part 110b may be caught by the catching projections 111a provided at the first base part 110a to prevent the first base part 110a and the second base part 110b from being separated from each other.

Although, in the embodiment shown in FIGS. 15 and 16, the extension projections 111b are shown as being provided at the second base part 110b, the extension projections 111b may be provided at the first base part 110a.

Also, although a pair of extension projections 111b is shown as being formed at the second base part 110b so that the extension projections 111b are spaced apart from each other, the extension projections 111b may be provided at the respective base parts in a symmetrical fashion, and the catching projections 111a corresponding to the extension projections 111b provided at one of the base parts may be provided at the other base part.

That is, the constraining means may be provided in the shape of projections provided at opposite sides of the base parts constituting the base. The position of the constraining means may be changed as needed. In addition, the number of the constraining means may be increased or decreased as needed.

The constraining means 111 are preferably provided at the boundary regions of the base parts constituting the base to prevent the bottom boundary regions of the base from being separated from each other by internal pressure of the airtightness member 135 disposed therebetween during assembly and fastening of the base.

In the fiber optics connection box according to the present invention, therefore, the constraining means 111 provided at the bottoms of the base parts prevent separation between the base parts 110a and 110b caused by the airtightness member provided to secure watertightness, etc., and therefore, it is possible to further secure watertightness of the fiber optics connection box.

Also, the fiber optics connection box according to the present invention may further include blocking parts 114b to prevent dislocation of gaskets 133a and 133b provided at a pair of through holes 130 provided at the central part of the base 100.

Also, as previously described, the pair of through holes 130a and 130b is opened toward the boundary line A, by which the first base part 110a and the second base part 110b are partitioned, and the gaskets 133a and 133b are disposed to seal the pair of through holes 130a and 130b. Consequently, the blocking parts 114b may be provided at one oil the first and second base parts 110a and 110b, e.g. the second base part 110b, at which the through holes are not formed.

Specifically, the blocking parts 114b may protrude from the upper side and the lower side of the base part at which the through holes are not formed in the thickness direction thereof toward the through holes to prevent dislocation of the gaskets provided at the respective through holes.

That is, passing cables passing through the through holes 130a and 130b are pressed by the gaskets to secure watertightness, and therefore, the gaskets 133a and 133b are compressed and deformed when the passing cables are mounted in the though holes with the result that the gaskets 133a and 133b may escape to the upper sides and the lower sides of the through holes. For this reason, the blocking parts are formed at the upper side and the lower side of the base part at which the through holes are not formed in the thickness direction thereof so as to protrude toward the through holes to prevent dislocation of the gaskets 133a and 133b, each of which is made of a soft material.

In the fiber optics connection box according to the present invention, therefore, the gaskets provided at the through holes formed through the central part of the base are prevented from escaping the through holes in the longitudinal direction of the passing cables even when the passing cables are mounted in the through holes, and therefore, it is possible to provide reliable watertightness.

According to the fiber optics connection box 1000 with the above-stated construction, the fastening bosses, to which the fastening members to seal the inlet ports and the outlet ports are fastened, are integrally formed at the base. Upon assembly of the fiber optics connection box, therefore, it is possible to reduce assembly time and to shorten the assembly process, thereby improving assembly efficiency.

Also, the base includes the first base part and the second base part, and the through holes are spaced apart from the connection line between the first base part and the second base part. When the first base part and the second base part are separated from each other for maintenance, therefore, the passing cables are prevented from being separated from the through holes, thereby improving work efficiency.

Also, the sealing members are provided to seal the inlet ports and the outlet ports, the gaskets are provided to seal the through holes, and the airtightness member is provided to seal the space between the first base part and the second base part. When the base is assembled to the cover, therefore, it is possible to prevent moisture from infiltrating into the fiber optics connection box through the base, thereby improving airtightness.

Also, in the fiber optics connection box according to the present invention, the fastening bosses, to which the fastening members to seal the inlet ports and the outlet ports are fastened, are integrally formed at the base. Consequently, an additional structure for achieving sealing of the inlet ports and the outlet ports and, at the same time, fastening of the inlet ports and the outlet ports is not necessary, thereby greatly reducing product cost.

Also, in the fiber optics connection box according to the present invention, the constraining means provided at the bottoms of the base parts prevents separation between the base parts caused by the airtightness member provided to secure watertightness, etc., and therefore, it is possible to further secure watertightness of the fiber optics connection box.

Also, in the fiber optics connection box according to the present invention, the gaskets provided at the through holes formed through the central part of the base are prevented from escaping the through holes in the longitudinal direction of the passing cables even when the passing cables are mounted in the through holes, and therefore, it is possible to provide watertightness reliability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fiber optics connection box comprising:
    a cover having a receiving space defined therein;
    a base having an inlet port through which a feeding cable is introduced, the inlet port having a fastening boss, an outlet port through which out cables are withdrawn, the outlet port having a fastening boss, and a pair of through holes through which a passing cable passes via the receiving space of the cover, the base being provided to cover the receiving space;
    at least one optical processing module provided in the receiving space to split or splice the feeding cable into the out cables;
    a support frame mounted at the base to support the optical processing module;
    sealing members to seal the inlet port and the outlet port; and
    fastening members fastened into the fastening boss of the inlet port and the fastening boss of the outlet port in a state in which the sealing members are disposed at the inlet port and the outlet port, wherein
    the fastening bosses are integrally formed at the base, and the fastening bosses protrude outward from the base,
    wherein the base is provided with a protrusion part, to which the support frame is mounted, and the pair of through holes is provided at the protrusion part,
    wherein the base comprises a first base part and a second base part, which are detachably coupled to each other, and the protrusion part comprises a first protrusion part and a second protrusion part respectively provided at the first base part and the second base part so that the first protrusion part and the second protrusion part can be coupled to each other.

2. The fiber optics connection box according to claim 1, wherein the sealing members have through holes, through which the feeding cable and the out cables pass, and the sealing members are partially inserted in the respective fastening bosses.

3. The fiber optics connection box according to claim 1, wherein each of the sealing members has a inclined portion in which an outer diameter of each of the sealing members is changed.

4. The fiber optics connection box according to claim 3, wherein the inclined portion is formed at a whole portion of each of the sealing members.

5. The fiber optics connection box according to claim 3, wherein the inclined portion comprises a step part at which an outer circumferential inclination of each of the sealing members is increased and then decreased or decreased and then increased.

6. The fiber optics connection box according to claim 5, wherein the step part has an angle of greater than 0 to 60 degrees.

7. The fiber optics connection box according to claim 1, wherein the inlet port and the outlet port are disposed around the pair of through holes, the base comprises a first base part and a second base part, which are detachably coupled to each other, and the pair of through holes is provided at the first base part or the second base part constituting the base.

8. The fiber optics connection box according to claim 7, wherein the pair of through holes is provided at a central part of the base.

9. The fiber optics connection box according to claim 8, wherein the first base part and the second base part have different sizes.

10. The fiber optics connection box according to claim 8, wherein a boundary line, by which the first base part and the second base part are partitioned from each other, is spaced apart from a center line passing through centers of the pair of the through holes by a predetermined distance.

11. The fiber optics connection box according to claim 10, wherein the distance between the boundary line and the center line is equal to or greater than a radius of each of the through holes.

12. The fiber optics connection box according to claim 1, wherein the base comprises a first base part and a second base part, which are detachably coupled to each other, and the pair of through holes is respectively provided at the first base part and the second base part.

13. The fiber optics connection box according to claim 1, wherein the base comprises a first base part and a second base part, which are detachably coupled to each other, the inlet port comprises a pair of inlet ports, the outlet port comprises a pair of outlet ports, and the pair of inlet ports and the pair of outlet ports are respectively provided at the first base part and the second base part.

14. The fiber optics connection box according to claim 1, wherein the passing cables pass through the pair of through holes, and the fiber optics connection box further comprises gaskets to seal the through holes.

15. The fiber optics connection box according to claim 14, wherein the pair of through holes is opened toward the boundary line, by which the first base part and the second base part are partitioned, and the gaskets are disposed to seal the pair of through holes.

16. The fiber optics connection box according to claim 1, wherein at least one of the first and second protrusion parts is provided with an airtightness member to seal.

17. The fiber optics connection box according to claim 1, wherein the at least one optical processing module comprises a plurality of optical processing modules provided at a front of the support frame in a stacked state, the support frame is provided at a rear thereof with a receiving part for receiving the passing cables in an arranged state, and the receiving part comprises at least one holder integrally formed at the rear of the support frame.

18. The fiber optics connection box according to claim 7, wherein the first base part and the second base part constituting the base have a constraining means to prevent bottom boundary regions of the base from being separated from each other in a state in which the first base part and the second base part are assembled and fastened to each other.

19. The fiber optics connection box according to claim 18, wherein the constraining means comprises:
 an extension projection formed so as to extend from one of the first and second base parts toward the other base part; and
 a catching projection provided at the other base part to catch the extension projection.

20. The fiber optics connection box according to claim 19, wherein the extension projection is a T-shaped projection having branched front ends, and the catching projection is a pair of projections to catch the front ends of the extension projection.

21. The fiber optics connection box according to claim 20, wherein the extension projection comprises a pair of extension projections spaced apart from each other, and catching projection comprises two sets of catching projections provided at positions corresponding to the extension projections.

22. The fiber optics connection box according to claim 7, wherein the base part at which the through holes are not formed, which is one of the first and second base parts, is provided at an upper side and a lower side thereof in a thickness direction with blocking parts protruding toward the through holes to prevent dislocation of gaskets provided at the through holes.

23. A fiber optics connection box comprising:
 a first base part and a second base part provided with a plurality of cable inlet ports and a plurality of cable outlet ports, fastening bosses being formed at the inlet ports and the outlet ports, the first base part and the second base part having different sizes;
 a cover fastened to the first base part and the second base part, the cover being configured to receive at least one optical processing module for splitting or splicing a cable introduced into a receiving space defined therein;
 at least one optical processing module provided in the receiving space to split or splice feeding cable into out cables;
 a support frame mounted at the base to support the optical processing module; and
 sealing members, each of which has an inclined section formed at a side thereof to seal the inlet ports and the outlet ports, the sealing members being mounted to fastening bosses by fastening members in a state in which a portion of each of the sealing members is fitted in a through hole formed in a corresponding one of the fastening bosses,
 wherein the inclined section comprises a step part at which an outer circumferential inclination of each of the sealing members is increased and then decreased or decreased and then increased, wherein the step part has an angle of greater than 0 to 60 degrees.

24. The fiber optics connection box according to claim 23, wherein the first base part and the second base part comprise a first protrusion part and a second protrusion part respectively so that the first protrusion part and the second protrusion part can be coupled to each other and the support frame is mounted to the coupled first and second protrusion parts.

* * * * *